United States Patent [19]
Sutton

[11] Patent Number: 5,805,648
[45] Date of Patent: Sep. 8, 1998

[54] METHOD AND APPARATUS FOR PERFORMING SEARCH ACQUISITION IN A CDMA COMMUNICATION SYSTEM

[75] Inventor: Todd R. Sutton, San Diego, Calif.

[73] Assignee: Qualcomm Incorporated, San Diego, Calif.

[21] Appl. No.: 509,721

[22] Filed: Jul. 31, 1995

[51] Int. Cl.$^6$ .............................. H04L 7/00; H04K 1/00
[52] U.S. Cl. ............................................ 375/367; 375/206
[58] Field of Search ..................... 375/205, 206, 375/208, 367, 368, 365, 366; 327/164; 370/178, 179

[56] References Cited

U.S. PATENT DOCUMENTS

| | | | |
|---|---|---|---|
| 3,715,508 | 2/1973 | Blasbalg | 179/15 BC |
| 4,052,565 | 10/1977 | Baxter et al. | 179/1.5 S |
| 4,301,530 | 11/1981 | Gutleber | 370/18 |
| 4,460,992 | 7/1984 | Gutleber | 370/19 |
| 4,472,815 | 9/1984 | Gutleber | 375/34 |
| 4,635,221 | 1/1987 | Kerr | 364/821 |
| 4,730,340 | 3/1988 | Frazier, Jr. | 375/1 |
| 4,872,200 | 10/1989 | Jansen | 380/34 |
| 4,901,307 | 2/1990 | Gilhousen et al. | 370/18 |
| 4,933,952 | 6/1990 | Albrieux et al. | 375/1 |
| 4,939,745 | 7/1990 | Kirimoto et al. | 375/1 |
| 5,101,501 | 3/1992 | Gilhousen et al. | 455/33 |
| 5,103,459 | 4/1992 | Gilhousen et al. | 375/1 |
| 5,177,765 | 1/1993 | Holland et al. | 375/1 |
| 5,179,571 | 1/1993 | Schilling | 375/205 |
| 5,400,359 | 3/1995 | Hikoso et al. | 375/367 |
| 5,509,035 | 4/1996 | Teidemann, Jr. et al. | 375/367 |

FOREIGN PATENT DOCUMENTS 9104400 1/1992 WIPO .......................... H04L 27/30

OTHER PUBLICATIONS

Orthogonal Sets of Functions, Advanced Engineering Mathematics, Erwin Kreyszig, Chapter 4, 1979.

Nonlinear Estimation of PSK–Modulated Carrier Phase with Application to Burst Digital Transmission, Andrew J. Viterbi, et al., IEEE Transactions on Information Theory, vol. IT–29, No. 4, pp. 543–551, Jul. 1983.

*Primary Examiner*—Tesfaldet Bocure
*Attorney, Agent, or Firm*—Russell B. Miller; Roger W. Martin; Sean English

[57] ABSTRACT

A novel and improved method of acquisition in a spread spectrum communication system is presented. In the present invention, a large window of PN chip offset hypotheses are searched and if an energy signal is found that might indicate the presence of the pilot signal having one of the chip offsets of the large search window, then a search of a subset of offset hypotheses, or small window, is searched.

12 Claims, 4 Drawing Sheets

METHOD AND APPARATUS FOR PERFORMING SEARCH ACQUISITION IN A CDMA COMMUNICATION SYSTEM

BACKGROUND OF THE INVENTION

I. Field of the Invention

The present invention relates to spread spectrum communications. More particularly, the present invention relates to a novel and improved method and apparatus for acquisition in spread spectrum communication environment.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb.13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth.

Space or path diversity is obtained by providing multiple signal paths through simultaneous links from a remote user through two or more cellsites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and remote unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition. The use of a pilot signal enables the remote user to acquire local base station communication system in a timely manner. The remote user gets synchronization information and relative signal power information from the received pilot signal.

SUMMARY OF THE INVENTION

The present invention is a novel and improved method and apparatus that reduces the remote user forward link acquisition time. It is an advantage of the present invention to minimize the total time for acquisition by speeding up the search methodology without incurring excessive penalties for false acquisition.

In a conventional serial search, one set of search parameters is used. This set of parameters is optimal for a given operating condition. In better operating conditions, the acquisition time does not significantly improve. However, in worse operating conditions, the acquisition time increases greatly. The present invention uses several sets of parameters optimized for different points throughout the operating range. The goal is to provide enhanced acquisition performance throughout the entire operating range.

In the present invention, it is initially assumed that a good operating condition exists. If after a sweep or search through all PN phase offsets of this set of parameters acquisition has not occurred, the actual operating condition is most likely sub-optimal. The present invention uses an alternative set of parameters for the next sweep or search. After each sweep or search through all PN phase offsets, the search parameters are changed. Each new set of parameters is optimized for a different operating condition. In the exemplary embodiment, each set of parameters is optimized to acquire at an increasingly worse operating condition.

In the present invention, the window size, number of coherent accumulations, number of non-coherent accumulations, and thresholds are varied from sweep to sweep. After each sweep through all PN hypotheses, the sweep parameters will change.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

In a spread spectrum communication system, a pilot signal is used to synchronize a remote user in phase and frequency to the transmissions of a base station. In the exemplary embodiment, the spread spectrum communication system is a direct-sequence spread spectrum communication system or more specifically a code division multiple access (CDMA) communication system. Examples of such systems are disclosed in detail in the aforementioned U.S. Pat. Nos. 5,056,109 and 5,103,459.

In a direct-sequence spread spectrum communication system, the transmitted signals are spread over a frequency band greater than the minimum bandwidth necessary to transmit the information. A carrier wave is modulated by the data signal, then the resulting signal is modulated again with a wideband spreading signal. A pilot signal can be looked at as an ordinary modulation signal with an all ones data sequence. The pilot signal is used to initially gain timing synchronization between the remote user and a central communications center.

In the exemplary embodiment, the spreading signal is generated by a linear feedback shift register, the implementation of which is described in detail in the aforementioned U.S. Pat. Nos. 5,056,109 and 5,103,459. The spreading signal can be viewed as a rotating phasor of the form:

$$s(t) = Ae^{-\omega t + \phi}. \tag{1}$$

In order to acquire, the remote user must synchronize to the received signals from the base station in both phase, $\phi$, and in frequency, $\omega$. The object of the searcher operation is to find the phase of the received signal, $\phi$. After finding the phase of the spreading signal, $\phi$, the frequency is found in using a demodulation element that has hardware for both phase and frequency tracking. The frequency estimate at the remote user must be close to the frequency of the pilot for acquisition of the phase to occur.

The method by which a remote user finds the phase of the received signal is by testing a predetermined subset of phases taken from the set of all possible phase offsets. The subset of phase offsets is referred to as a window. The remote user station determines whether any of the phase offsets in the window is synchronized with phase offset of the central communications center.

Figure 1:
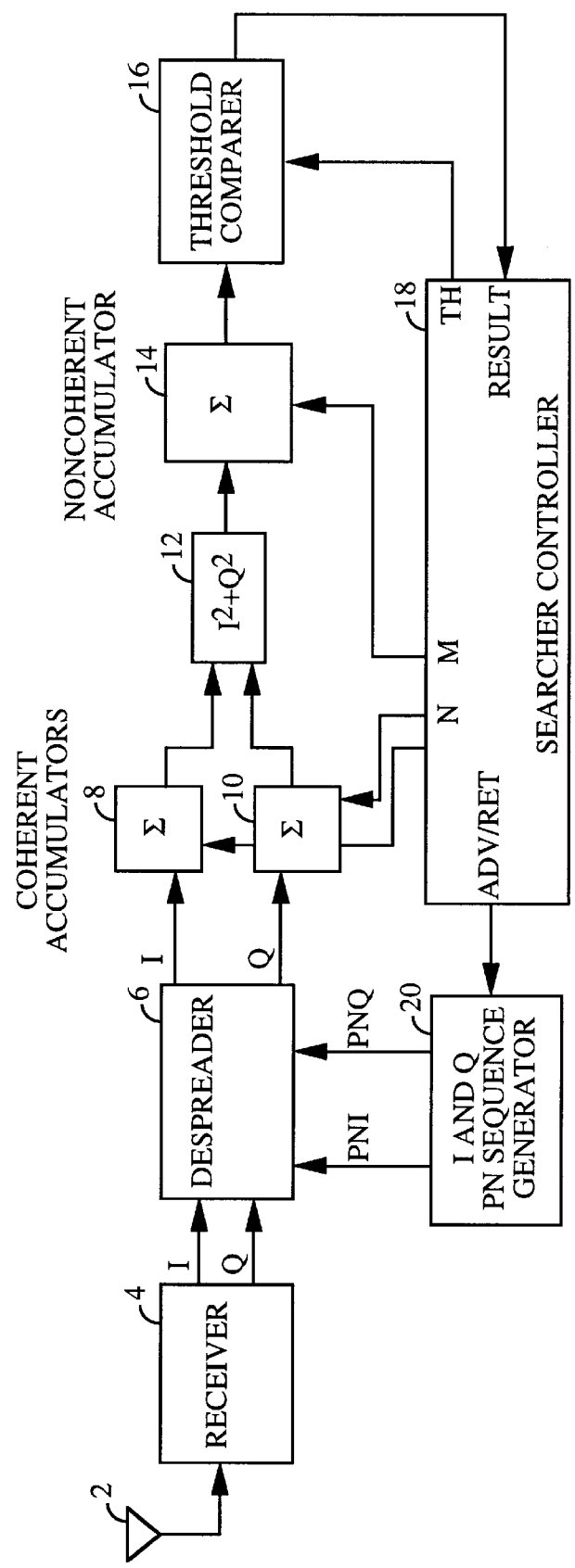
FIG. 1 is a block diagram of the present invention.

Turning now to the drawings, FIG. 1 illustrates the apparatus of the present invention. Upon power up, a spread spectrum signal is received at antenna 2. In the exemplary embodiment, the spread spectrum signal is comprised of frames of spread spectrum data. The objective of the apparatus is to gain synchronization between pseudorandom noise (PN) sequences generated by PN sequence generator 20 and the received spread spectrum signal which is spread by identical PN sequences of unknown phase at the central communications center.

In the exemplary embodiment, both the apparatus that spreads the pilot signal at the central communications center (not shown) and PN generator 20 are a maximal length shift register which generate the PN code sequences for spreading and despreading the pilot signal respectively. Thus, the operation of obtaining synchronization between the codes used to despread the received pilot signal and the PN spreading code of the received pilot signal involves determining the time offset of the shift register. In the exemplary embodiment, despreader 6 and PN sequence generator 20 are implemented in a microprocessor or micro-controller programmed to perform the despreading and sequence generating operations.

The spread spectrum signal is provided by antenna 2 to receiver 4. Receiver 4 downconverts the signal and provides the down converted signal to despreading element 6. Despreading element 6 multiplies the received signal by the PN code generated by PN generator 20. Due to the random noise like nature of the PN codes the energy of the product of the PN code and the received signal should be essentially zero except when the phase is correctly estimated.

However, due to a lack of synchronization on a chip level and due to introduced noise this is not the case, which gives rise to false alarm situations where the remote user may determine that it has successfully acquired the pilot signal but in realty has not. In order to give higher certainty to the determined condition of successful lock, the test is repeated a number of times. The number of times the test is repeated is determined by searcher controller 18. In the exemplary embodiment, searcher controller 18 is implemented using a microprocessor or micro-controller programmed to perform the control functions described.

Searcher controller 18 provides an offset hypothesis to PN generator 20. In the exemplary embodiment, the received signal is modulated by quadrature phase shift keying (QPSK), so PN generator 20 provides a PN sequence for the I modulation component and a separate sequence for the Q modulation component to despreading element 6. Despreading element 6 multiplies the PN sequence by its corresponding modulation component and provides the two output component products to coherent accumulators 8 and 10.

Coherent accumulators 8 and 10 sum the product over the length of the product sequence. In the exemplary embodiment, Coherent accumulators 8 and 10 are implemented in a microprocessor or microcontroller programmed to perform the accumulating operations. Coherent accumulators 8 and 10 are responsive to signals from searcher controller 18 for resetting, latching and setting the summation period.

The sums of the products are provided from summers 8 and 10 to squaring means 12. Squaring means 12 squares each of the sums and adds the squares together. In the exemplary embodiment, squaring means 12 is implemented in a microprocessor or micro-controller programmed to perform the squaring operations.

The sum of the squares is provided by squaring means 12 to noncoherent accumulator 14. Noncoherent accumulator 14 determines an energy value from the output of squaring means 12. Noncoherent accumulator 14 serves to counteract the effects of a frequency discrepancy between the base station transmit clocks and the remote user receive clock and aids in the detection statistic in a fading environment. In the exemplary embodiment, non-coherent accumulator 14 is implemented in a microprocessor or micro-controller programmed to perform the operation as described. If one knows that the frequency of the two clocks is exactly the same and that there is no deep fades then the ideal approach is to integrate the sequence over the entire accumulation period in the form:

$$E = \left( \sum_{n=1}^{N} I(n) PNI(n) \right)^2 + \left( \sum_{n=1}^{N} Q(n) PNQ(n) \right)^2, \tag{2}$$

where PNI (n) and PNQ(n) are ±1.

If, however, there is a probability of frequency mismatch or fading, then the correlator sacrifices some of its detection statistic in order to have a more robust correlation technique of the form:

$$E = \sum_{k=1}^{M} \left\{ \left( \sum_{n=1}^{N} I(n + (k-1)N) \cdot PNI(n + (k-1)N) \right)^2 + \left( \sum_{n=1}^{N} Q(n + (k-1)N) \cdot PNQ(n + (k-1)N) \right)^2 \right\} \tag{3}$$

Searcher controller 18 provides the value M to noncoherent accumulator 14.

Noncoherent accumulator 14 provides the energy signal to threshold comparer 16. Threshold comparer 16 compares the energy value to predetermined thresholds supplied by searcher controller means 18. The results of each of the comparisons is then fed back to searcher controller 18. Search controller 18 examines the comparisons and determines whether the window contains likely candidates for the correct offset then the window is scanned in accordance with the method of using a zoom window.

Figure 2:
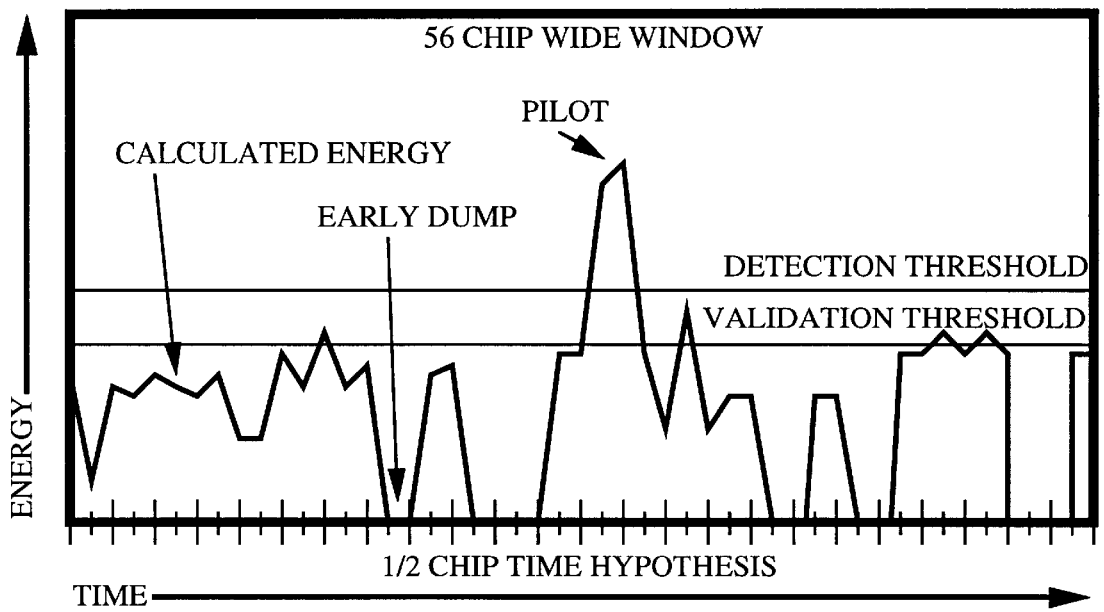
FIG. 2 is an illustration of the energy versus chip offset for a fixed window.

FIG. 2 illustrates a graph of the energy values versus the chip time hypothesis. In the exemplary embodiment, a window contain 56 chip hypotheses. The window illustrates the use of a two level threshold test. The thresholds denoted are detection threshold and validation threshold. When a calculated energy value exceeds the detection threshold, the window of PN offsets is scanned a predetermined number of times and each of these times the calculated energy value is required to exceed the validation threshold.

In the present invention, this search would continue with each new window until all possible windows had been tested. After searching all possible windows, a search would begin using a new window size, number of non-coherent accumulations, number of coherent accumulations, and thresholds.

Figure 3:
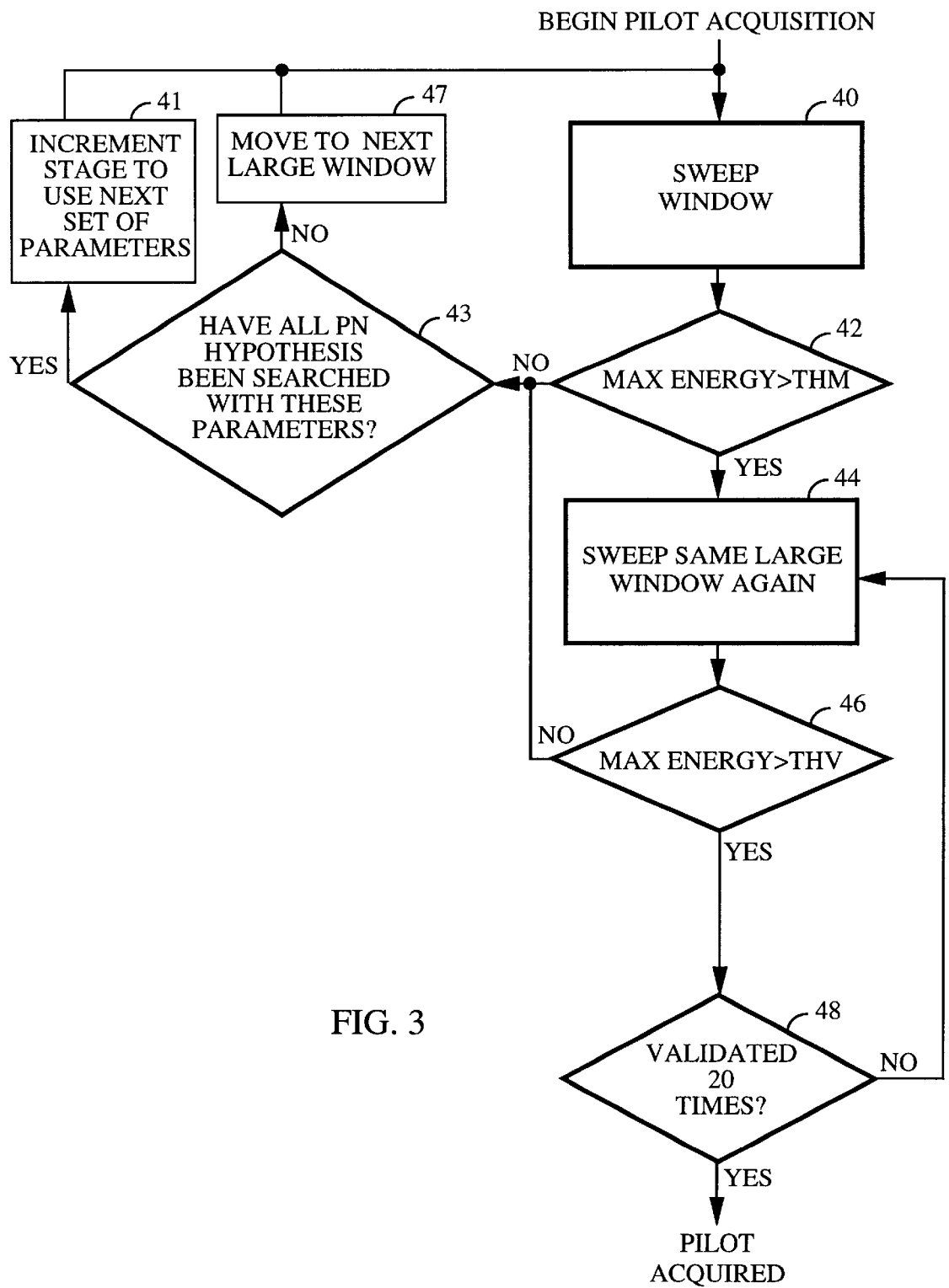
FIG. 3 is a flowchart illustrating the present invention operating in conjunction with a fixed window size implementation of the searcher algorithm.

FIG. 3 illustrates the present invention operating in conjunction with the method used for scanning windows of a fixed number of hypotheses. The flow starts in block 40, where the operation described in relation to FIG. 1 is performed to give comparison results as illustrated in FIG. 2. If the window is "swept" and no hypothesis's energy exceeds the detection threshold (THM) in block 42, then the flow would go to block 41 which checks if all windows had been swept using the current set of parameters.

In block 41, if any of the windows of PN functions have not been tested, then the flow proceeds to the next window in block 47 and the flow repeats with a sweep of the new window in block 40. If in block 41, all windows have been swept using the current set of parameters, then the flow proceeds to block 43 where a new set of parameters are provided by searcher controller 18. The flow proceeds to sweep the initial window using the new parameters in block 40. Illustrated in Table I below are the sets of parameters used in the exemplary embodiment.

TABLE I

|  | Window Search | | | |
| --- | --- | --- | --- | --- |
|  | Stage 1 | Stage 2 | Stage 3 | Stage 4 |
| window size | 64 | 64 | 64 | 24 |
| # of chips to integrate (N) | 128 | 160 | 128 | 72 |
| # of non-coherent passes (M) | 1 | 1 | 3 | 7 |
| THM | 173 | 189 | 270 | 36 |
| Verification |  |  |  |  |
| # of chips to integrate (N) | 128 | 160 | 128 | 72 |
| # of non-coherent passes (M) | 8 | 8 | 8 | 8 |
| THV | 81 | 103 | 81 | 0 |

In the exemplary embodiment, each stage (i.e. stages 1–4) is performed with a different window size, number of chips to integrate, number of coherent passes, an early dump chip number, an early dump threshold and a window acceptance threshold.

The numbers provided in Table I are illustrative and it is envisioned that other window sizes, thresholds and integration parameters could be used. After each set of window has been exhaustively searched, a new set of search parameters are used which as described above are optimized for different operating conditions. In the exemplary embodiment, the values of Table I are stored in a memory device (not shown) within searcher controller 18.

Returning to block 42, if there are points on the calculated energy curve which do exceed the detection threshold (THM), then the flow proceeds to the validation phase in block 44. In block 44, the same large window is swept again, and this time the calculated energy is compared against the lower threshold value, validation threshold (THV). If in block 46 the maximum energy detected does not exceed the threshold (THV), then the flow proceeds to block 41 and the process proceeds as described above.

If in block 46 the maximum energy detected exceeds the threshold (THV), then the flow proceeds to block 41 and the process continues as described above. The flow proceeds to block 48 which determines if validation for twenty consecutive windows has occurred. If fewer than N validation tests, where for example N equals twenty, have been conducted then the flow proceeds to block 44 and the large window is swept again. However, after N consecutive successful validation tests then the pilot is determined to be acquired.

Figure 4:
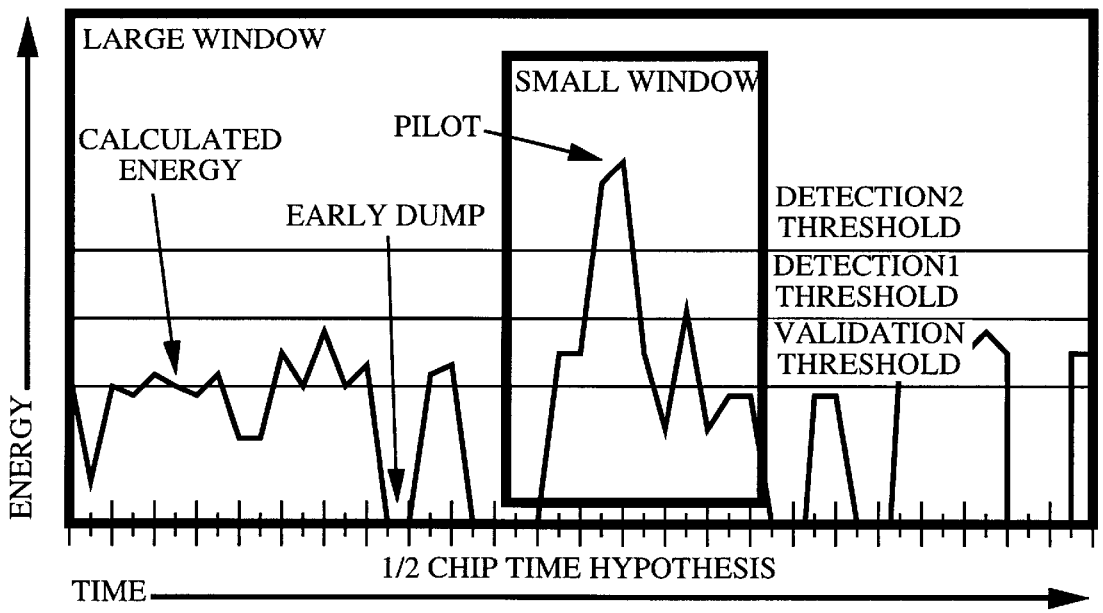
FIG. 4 is an illustration of the energy versus chip offset for the zoom window of the present invention.

Turning to FIG. 4, the calculated energy curve is illustrated with use of a zoom window. A zoom window is subset of PN functions selected from among the set of PN values in the large window. This zoom window is selected in accordance with the peak of the energy curve. When a peak is detected, the searcher controller 18 zooms in on that peak and tests PN values in a smaller set close to the PN value that gave rise to the detected peak.

Figure 5:
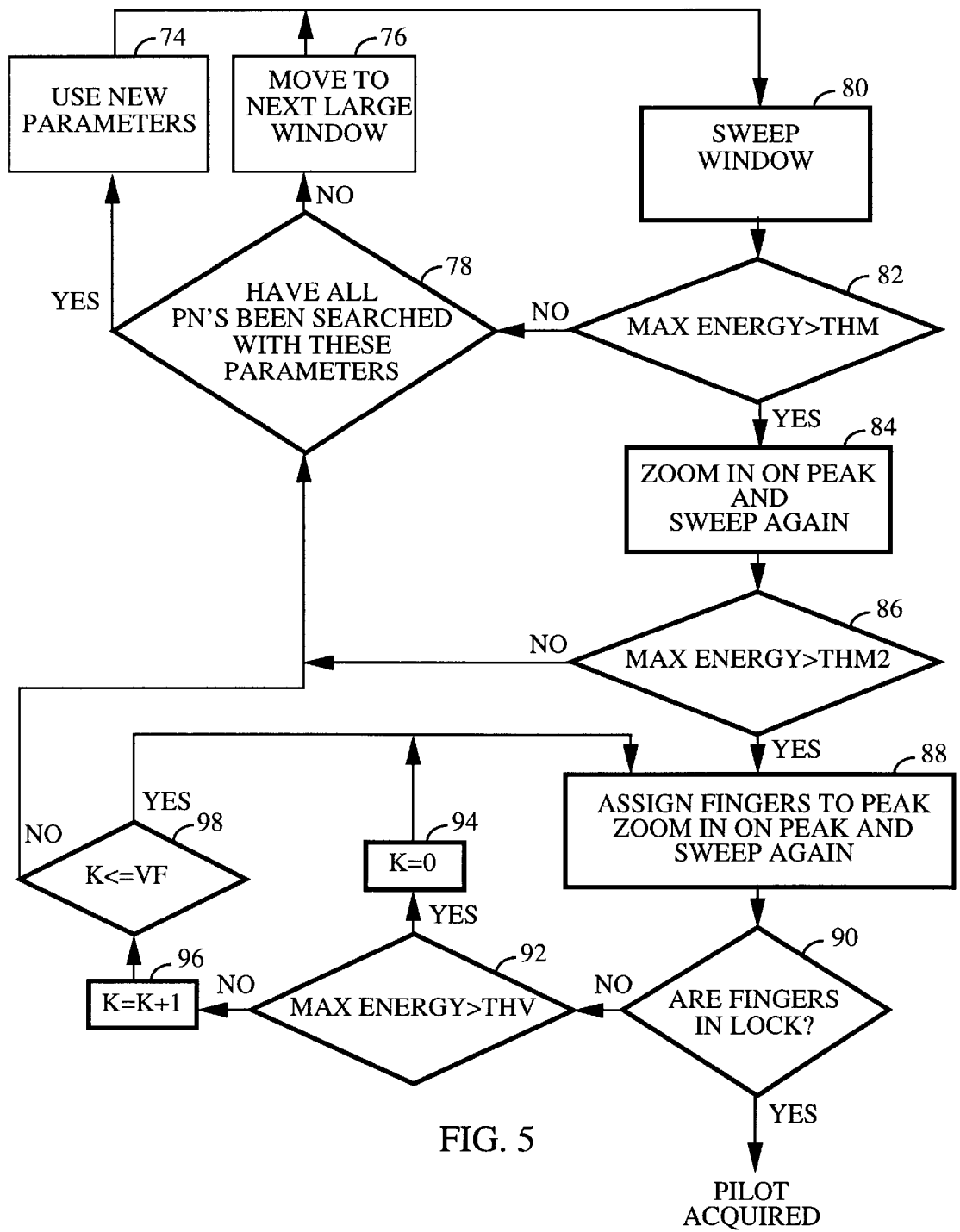
FIG. 5 is a flowchart illustrating the present invention operating in conjunction with a variable window size implementation of the searcher algorithm.

In FIG. 5, a flowchart illustrating the method by which the searcher of the present invention operates is shown. In FIG. 5, a three stage acquisition technique is used. In block 80, a large window of PN values is swept. Searcher controller 18 examines the computed energy values and determines if there is a computed energy value greater than Detection Threshold 2 (THM2). If no energy value is detected greater than THM2 then the flow moves to block 78. In block 78, the present invention determines whether all the windows have been tested using the present set of parameters.

In block 78, if any windows have not been searched using the current set of parameters, then the flow proceeds to block 76. In block 76, the next predetermined window of PN functions is selected and the flow moves to block 80, where the process continues as described earlier. If all windows have been searched using the current set of parameters, then the flow proceeds to block 74. In block 74, the next set of parameters for performing the search are selected and the flow moves to block 80, where the process continues as described earlier.

The pattern of parameters used in the exemplary embodiment of the present invention operating in conjunction with a zoom search operation is the same as that using a fixed search window size. In the exemplary embodiment of the present invention, the set of parameters used is that shown in Table II below.

TABLE II

|  | Window Search | | | |
| --- | --- | --- | --- | --- |
|  | Stage 1 | Stage 2 | Stage 3 | Stage 4 |
| window size | 64 | 64 | 64 | 24 |
| # of chips to integrate (N) | 128 | 160 | 128 | 72 |
| # of non-coherent passes (M) | 1 | 1 | 3 | 7 |
| THM | 173 | 189 | 270 | 36 |
| Zoom Window Search |  |  |  |  |
| zoom window size | 6 | 6 | 6 | 6 |
| # of chips to integrate (N) | 128 | 160 | 128 | 72 |
| # of non-coherent passes (M) | 2 | 2 | 6 | 8 |
| THM2 | 378 | 479 | 270 | 36 |

TABLE II-continued

|  | Window Search | | | |
| --- | --- | --- | --- | --- |
|  | Stage 1 | Stage 2 | Stage 3 | Stage 4 |
| Verification | | | | |
| window size | 6 | 6 | 6 | 6 |
| # of chips to integrate (N) | 128 | 160 | 128 | 72 |
| # of non-coherent passes (M) | 8 | 8 | 8 | 8 |
| THV | 81 | 103 | 81 | 0 |

In the exemplary embodiment, each stage (i.e. stages 1–4) is performed with a different window size, number of chips to integrate, number of coherent passes, an early dump chip number, an early dump threshold and a window acceptance threshold.

The numbers provided in Table II are illustrative and it is envisioned that other window sizes, thresholds and integration parameters could be used. After each set of window has been exhaustively searched, a new set of search parameters are used which as described above are optimized for different operating conditions. In the exemplary embodiment, the values of Table II are stored in a memory device (not shown) within searcher controller 18.

When in block 82, if a peak greater than THM is found in a large window, then the flow proceeds to block 84. This time a sweep in a smaller set of PN values around the detected peak is performed. This smaller set of PN values is illustrated in FIG. 4 as the small window. The use of the small window for the second verification is to reduce the acquisition time by reducing the time to test for false alarms. A false alarm occurs when the remote station initially believes it has detected the phase offset for acquisition, but in reality has not.

The time it takes to perform this second test is reduced proportionally to the ratio between the number of PN values to test in the small window and the number of PN values in the large window. Noncoherent accumulations are performed on the data from this small window search in order to have a better operating characteristic.

In block 86, if there is energy greater than detection threshold 2 (THM2), the search enters the validation phase. If no energy greater than the threshold THM2 is found then the flow returns to block 78 and the process continues as described previously. If in block 86, it is determined that there is a calculated energy value greater than detection threshold 2 (THM2), then the flow proceeds to block 88.

In the exemplary embodiment, there are three conditions under which validation is stopped. Validation is stopped if the sweep fails $V_f$ times in a row. Validation is also stopped if the frequency estimate doubles back one it self from on 100 ms sample to the next. Finally, validation is stopped if the system determines that the pilot has been acquired.

In block 88, the received signal is demodulated in accordance with the selected PN function. The results of the demodulated signal are analyzed to determine if the system is in lock, and if so then acquisition is complete. If the demodulation results indicate that the signal is not in lock, then the flow proceeds to block 92.

In block 92, the calculated energy values for the small window are compared to the validation threshold value (THV). If in block 92, there are calculated energy values in the small window which exceed the validation threshold (THV), then the flow proceeds to block 94 where a counter variable is set to zero. The process then loops back to block 88 and the flow continues as previously described.

If in block 92, there are no calculated energy values in the small window which exceed the validation threshold, then the flow proceeds to block 96 where a counter variable is incremented. The flow proceeds back to block 98, which checks if the validation test has failed $V_f$ times in a row. If the validation test has failed $V_f$ times in a row, then the flow proceeds to block 78 and the process continues as described previously. In the exemplary embodiment, if the validation test has not failed twice in a row, then the flow proceeds to block 88 and the operation continues as described previously.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for determining a synchronized PN sequence, comprising the steps of:

demodulating a received signal by a first plurality of PN sequences of a first set of windows of PN sequences determined in accordance with a first window parameter format to provide a first set of demodulation metrics;

analyzing said first set of demodulation metrics to determine whether said synchronized PN sequence is of said first plurality of PN sequences; and demodulating said received signal by a second plurality of PN sequences of a second set of windows of PN sequences determined in accordance with a second window parameter format to provide a second set of demodulation metrics;

wherein said first window parameter format further comprises a number of passes for verification.

2. The method of claim 1 wherein said first window parameter format comprises a window size and set of acquisition threshold values.

3. The method of claim 2 wherein said first window parameter format further comprises coherent accumulator parameters.

4. The method of claim 1 further comprising the step of demodulating said received signal by a first subset of PN sequences of said first set of windows of PN sequences to provide a first subset of demodulation metrics when said step of analyzing said first set of demodulation metrics indicates that said synchronized PN sequence is of said first plurality of PN sequences.

5. The method of claim 4 further comprising analyzing said first subset of demodulation metrics to determine whether said synchronized PN sequence is of said first subset of PN sequences.

6. The method of claim 1 wherein said step of analyzing said first set of demodulation metrics comprises comparing said demodulation metrics against a demodulated signal energy threshold.

7. An apparatus for determining a synchronized PN sequence, comprising:

demodulator means for demodulating a received signal by a first plurality of PN sequences of a first set of windows of PN sequences determined in accordance with a first window parameter format to provide a first set of demodulation metrics; and analysis means for analyzing said first set of demodulation metrics to determine whether said synchronized PN sequence is of said first plurality of PN sequences;

wherein said demodulator means is further for demodulating said received signal by a second plurality of PN sequences of a second set of windows of PN sequences determined in accordance with a second window parameter format to provide a second set of demodulation metrics;

wherein said first window parameter format further comprises a number of passes for verification.

8. The apparatus of claim 7 wherein said first window parameter format comprises a window size and set of acquisition threshold values.

9. The apparatus of claim 8 wherein said first window parameter format further comprises coherent accumulator parameters.

10. The apparatus of claim 7 wherein said demodulation means is further for demodulating said received signal by a first subset of PN sequences of said first set of windows of PN sequences to provide a first subset of demodulation metrics when said step of analyzing said first set of demodulation metrics indicates that said synchronized PN sequence is of said first plurality of PN sequences.

11. The apparatus of claim 10 wherein said analysis means is further for analyzing said first subset of demodulation metrics to determine whether said synchronized PN sequence is of said first subset of PN sequences.

12. The apparatus of claim 7 wherein said analysis means is for comparing said demodulation metrics against a demodulated signal energy threshold.

* * * * *